May 22, 1934.　　　　S. COHEN　　　　1,959,814
COMPENSATING CONDENSER
Filed Feb. 9, 1931　　　2 Sheets-Sheet 1
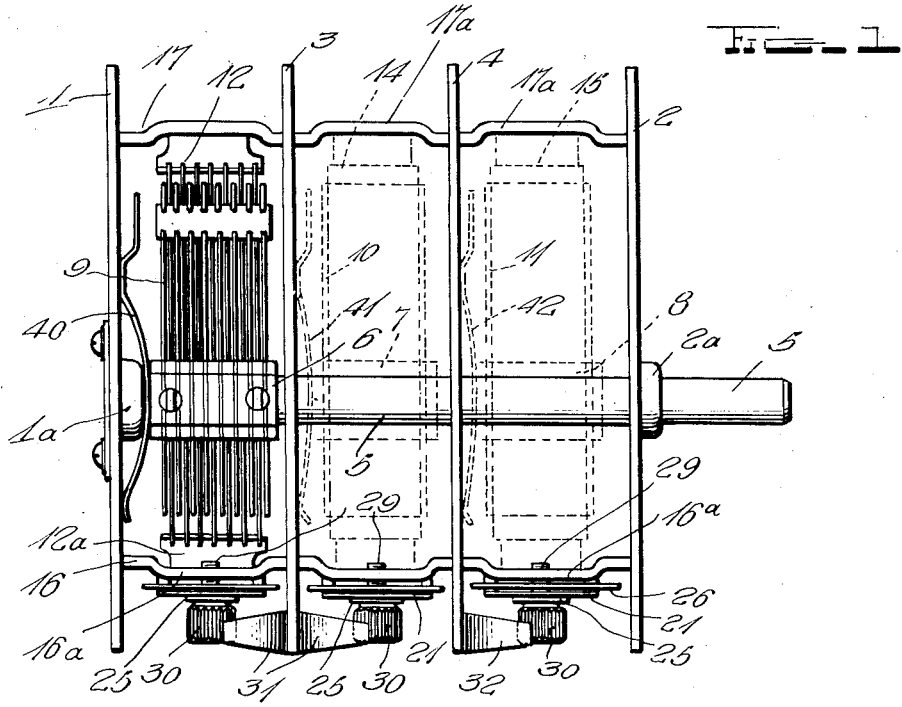
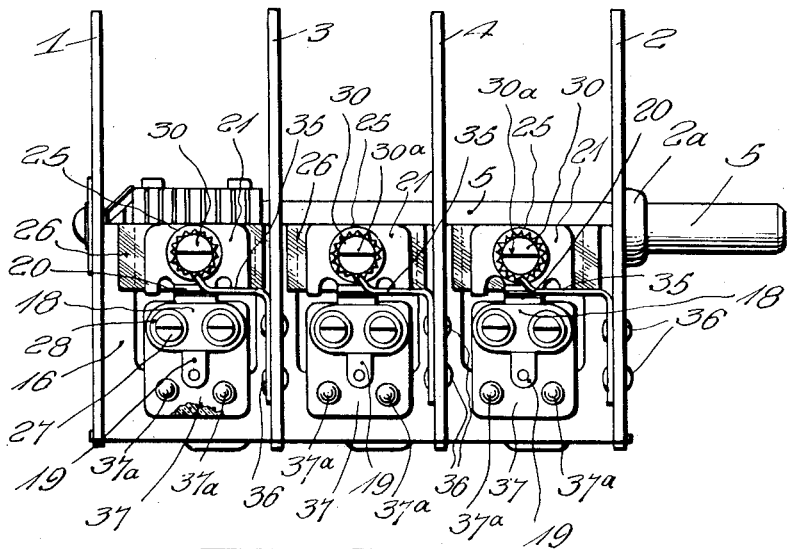
INVENTOR.
Samuel Cohen,
BY John O. Brady
ATTORNEY.

May 22, 1934.　　　　S. COHEN　　　　1,959,814
COMPENSATING CONDENSER
Filed Feb. 9, 1931　　2 Sheets-Sheet 2
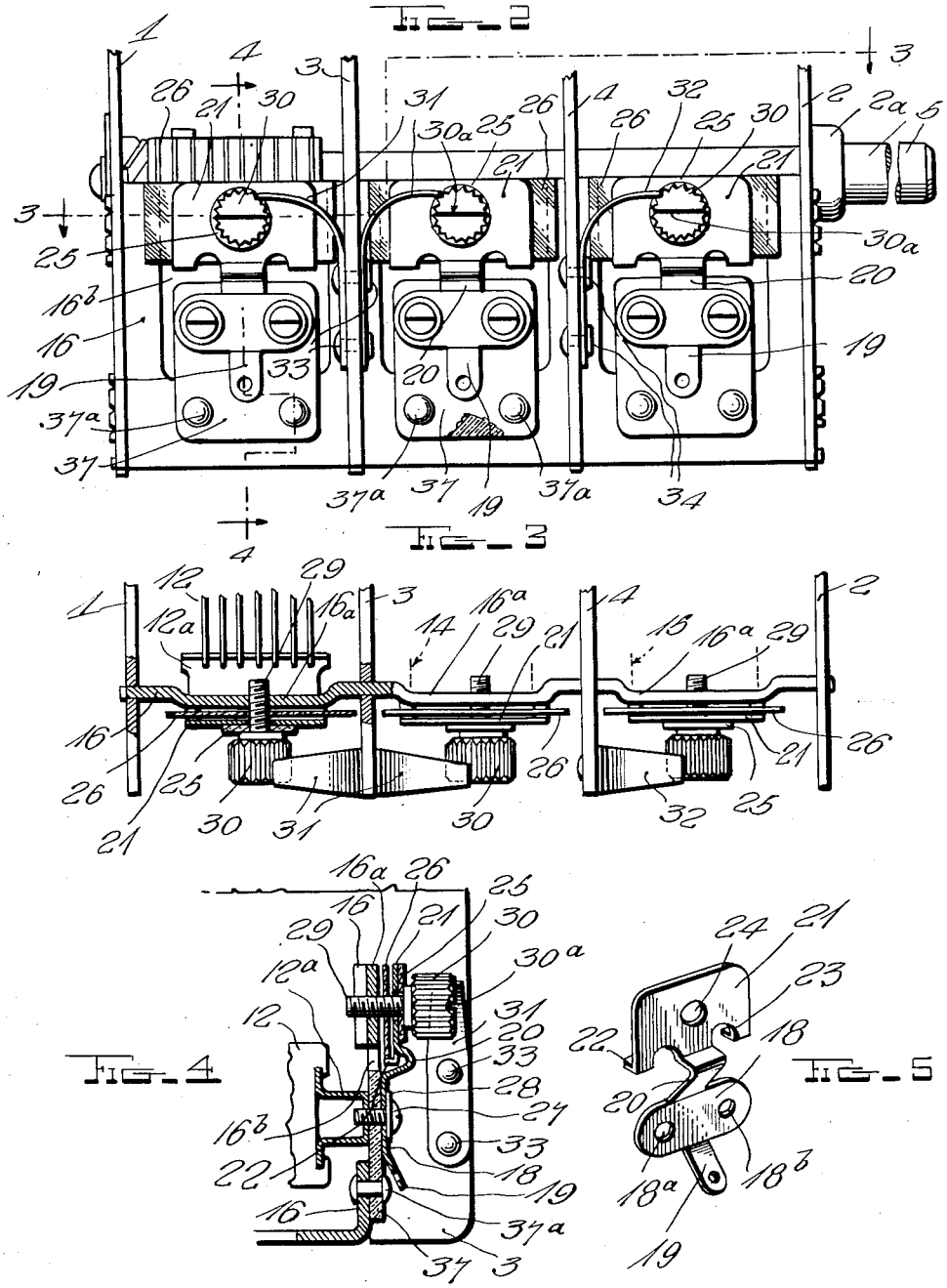
INVENTOR.
Samuel Cohen,
BY John B. Brady
ATTORNEY.

Patented May 22, 1934

1,959,814

UNITED STATES PATENT OFFICE 1,959,814

COMPENSATING CONDENSER

Samuel Cohen, Brooklyn, N. Y., assignor to General Instrument Corporation, New York, N. Y., a corporation of New York Application February 9, 1931, Serial No. 514,681

3 Claims. (Cl. 175—41.5)

My invention relates broadly to multiple variable condensers and more particularly to a construction of compensating condenser for multiple variable condenser systems for adjusting the maximum to minimum capacity ratio in each of the circuits in which the different sets of condensers are connected.

One of the objects of my invention is to provide a construction of compensating condenser for adjusting the maximum to minimum capacity ratio of each of the condenser systems in a multiple variable condenser and positively locking the compensating condensers in adjusted position after the selected adjustment has been obtained.

Another object of my invention is to provide a construction of compensating condenser for a multiple variable condenser system which may be manufactured inexpensively on a quantity production scale and readily mounted upon the chassis of a multiple variable condenser for effecting selected adjustments when the condenser circuits are tested and inspected.

Still another object of my invention is to provide a construction of compensating condenser including a movable element adapted to be insulatingly supported with respect to one side of the condenser chassis and varied in spacial relation with respect to the condenser frame, a dielectric sheet being supported upon the movable element and adapted to be shifted with the movable element as the spacial relation between the movable element and the side of the condenser frame is selectively adjusted.

A further object of my invention is to provide a construction of compensating condenser including a movable element adjustable with respect to one side of the condenser frame with a friction clutch adapted to adjust and maintain the movable element in a predetermined spacial relation with respect to the side of the condenser chassis.

A still further object of my invention is to provide an arrangement of compensating condensers disposed between the electrostatic shields separating one set of rotor and stator plates from an adjacent set in a multiple unit condenser system with means supported on the electrostatic shield for locking the compensating condenser in a selected capacity position.

Other and further objects of my invention reside in the construction of a simplified form of compensating condenser in a multiple variable condenser system as set forth more fully in the specification hereinafter following by reference to the accompanying drawings, in which:

Figure 1 is a plan view of a multiple unit gang condenser showing the arrangement of compensating condensers employed in the variable condenser system; Fig. 2 is a side elevation of the multiple condensers showing the method which I employ for mounting the compensating condensers with respect to the sets of rotor and stator plates in the condenser system; Fig. 3 is a fragmentary sectional view taken through the multiple variable condenser on line 3—3 of Fig. 2 and illustrating the construction of one of the compensating condensers; Fig. 4 is a cross-sectional view through one of the compensating condensers taken on line 4—4 of Fig. 2; Fig. 5 is a perspective view of the movable element of the compensating condenser; and Fig. 6 is an elevational view showing the compensating condensers mounted with respect to each of the sets of rotor and stator plates constituting the variable condensers and showing a modified method of locking the movable element of each condenser in a selected position.

Referring to the drawings in detail, reference characters 1 and 2 designate the end plates of the chassis of a multiple variable condenser having intermediate electrostatic shields 3 and 4 through which the rotatable shaft 5 extends. The rotatable shaft 5 is journalled in bearings $1a$ and $2a$ formed in the end plates 1 and 2. The rotatable shaft 5 carries sets of rotor plates 9, 10 and 11, secured upon spacer blocks 6, 7 and 8. Sets of stator plates are supported between the sides 16 and 17 of the condenser chassis as shown at 12, 14 and 15. The opposite sides of the condenser chassis are apertured as indicated at $16b$ and are offset as represented at $16a$. An insulated plate 37 is secured to the lower portion of the side 16 of the condenser chassis and extends upwardly adjacent the apertured portion $16b$ of the side 16. The insulated plate 37 is secured to the side of the condenser chassis 16 by means of rivets $37a$, and provides means for supporting the movable plate element compensating condenser. Each compensating condenser comprises a movable plate element as shown more clearly in Fig. 5 having a supporting portion 18 apertured at $18a$ and $18b$ for the passage of screws 27 through washers 28 and into the end supports of the sets of laterally extending stator plates. As shown in Fig. 4, the end support for the set of stator plates 12 comprises a longitudinally extending member $12a$ into which the screws 27 extend for supporting the stator plates with respect to the condenser chassis. That is to say, the screws 27 serve to support the stator plates and also provide mounting means for the movable plate element of the compensating condenser. An angularly disposed lug 19 extends from the supporting portion 18 of the movable plate element and provides means for establishing connection with the sets of stator plates of the variable condenser and the movable plate element of the compensating condenser. A resilient connection 20 extends from the supporting portion 18 of the movable plate element to the movable plate 21. The movable plate 21 presents a flat capacity area with respect to the offset side 16a of the condenser frame, that is to say, the compensating condensers are effectively in shunt with each of the sets of rotor and stator plates. The rotor plates are grounded to the chassis so that the offset portion 16a is at the same potential as the rotor plates while the movable plate element 21 is at the same potential as the stator plates thus permitting a variation or adjustment in capacity across the sets of rotor and stator plates constituting each variable condenser.

The movable plate element 21 is apertured at 24 and carries at its lower edge a pair of inwardly projecting lugs 22 and 23 extending normal to the plate of the movable plate element 21. An adjusting screw 29 having a cylindrical head 30 with ratchet teeth extending longitudinally thereof, extends through the insulated collar 25, through the aperture 24 in the movable plate 21, and through an aperture in dielectric sheet 26 engaging screw threads formed in the offset side wall 16a of the condenser chassis. Dielectric sheet 26 is supported on lugs 22 and 23. Due to the resiliency of the resilient connection 20, the plate 21 tends to spring away from the offset portion 16a of the condenser chassis. The adjusting screw 29 operates to limit the spacial relation of the movable plate 21 with respect to the offset wall portion 16a of the condenser chassis, thereby controlling the effective capacity which is connected in shunt with the sets of stator and rotor plates. The cylindrical head 30 of the adjusting screw 29 is slotted at 30a enabling the screw driver to be inserted for effecting minute adjustment of the movable element. Clutch members 31 extend into the path of the ratchet teeth formed on the heads 30 and prevent free rotation of the adjusting screws. The clutch members 31 are secured by means of rivets 33 to opposite sides of the electrostatic shield separating two adjacent condenser systems. A single riveting operation is made in order to secure the clutch members 31 to the opposite sides of the electrostatic shield. The clutch members project in opposite directions from the shield toward the heads 30 of the adjusting screws. Each clutch member is inherently resilient and bears upon the toothed head 30 for preventing rotative movement of the adjusting screw except under positive adjustment by means of a tool inserted into the slot 30a in the head 30.

In a three-gang condenser such as illustrated in Fig. 1, employing a compensating condenser for each condenser unit there is a clutch member 32 riveted to the partition member 4 by means of rivets 34 which bears upon the toothed head 30 of the compensating condenser for the condenser system nearest the control end of the rotatable shaft 5. Where it is impractical to assemble the clutch members 31 back to back with respect to the partition member 3, I provide a clutch member individual to each of the partition plates or electrostatic shields 3 and 4 and individual to the end plate 2 as shown at 35, the clutch member being riveted to the adjacent partition or to the end plate by rivets 36 as shown. The clutch members on spring strips 35 enter the longitudinally extending teeth on the cylindrical heads 30 and prevent clockwise or counter-clockwise movement of the adjusting screws. The frictional engagement between the resilient strips and the toothed head of each adjusting screw is such that the special relation of the movable plate 21 with respect to the frame of the condenser at 16a may be controlled. That is, the natural tendency of the movable plate 21 is to spring outwardly away from the condenser frame under the action of spring 20. The adjusting screw 29 when moved in a counter-clockwise direction permits of maximum separation of the movable plate with respect to the stationary frame of the condenser. The adjusting screw when moved in a clockwise direction tends to decrease the spacial relation between the adjustable plate and the frame of the condenser. The aperture 24 in the plate 21 is made large enough to permit the adjusting screw 29 to pass freely through the plate 21 without electrically contacting therewith. The dielectric sheet 26 is supported on the inwardly projecting lugs 22 and 23 of plate 21 and serves at all times to insulatingly separate the movable plate 21 from the frame 16a of the variable condenser.

Separate connection is established with each of the sets of rotor plates by spring members which I have designated generally at 40, 41 and 42 which bear against the tubular mounting means 6, 7 and 8 for each of the sets of rotor plates 9, 10 and 11.

It will be observed that the assembly of the condenser system of my invention is greatly simplified by the mounting of the compensating condenser through the same mounting means as that which supports the stator of the main condenser. The construction of the compensating condensers is such that the condensers may be assembled on a quantity production basis inexpensively. The condenser affords a precision adjustment of the maximum to minimum capacity ratio of each of the tuning condensers and the permanency of the adjustment is insured by virture of the friction clutch lock on each of the compensating condensers. The construction set forth herein has proven successful and practical but I desire that it be understood that no limitations upon my invention are intended and that modifications of my invention may be made within the scope of the appended claims.

What I claim as new and desire to secure by Letters Patent of the United States is as follows:

1. A compensating condenser comprising a fixed plate, a movable plate insulated from said fixed plate at one side thereof and adjustable towards and away from the fixed plate, metallic members projecting from said movable plate towards said fixed plate, a dielectric sheet supported upon said metallic members between the fixed plate and movable plate, and means for adjusting said movable plate relative to the fixed plate and additional means for retaining the same in a selected position.

2. A compensating condenser comprising a fixed plate, an insulated support, an adjustable plate member having one end portion secured with respect to said support and its other end portion free and extending in spaced relation to a side face of the fixed plate, a pair of lugs projecting towards said fixed plate from the free end portion of said adjustable plate member, an adjusting screw extending through the free end portion of said adjustable plate member and out of electrical contact therewith for engaging said fixed plate and adjusting the adjustable plate towards and away from the fixed plate, and a dielectric sheet supported by said lugs between the free end portion of said adjustable plate member and the fixed plate.

3. A compensating condenser comprising a fixed plate, a movable plate insulated from said fixed plate at one side thereof and adjustable towards and away from the fixed plate, supporting means projecting from one edge of said movable plate towards said fixed plate, a dielectric sheet supported upon said supporting means between the fixed plate and movable plate, and means for adjusting said movable plate relative to the fixed plate and additional means for retaining the same in a selected position.

SAMUEL COHEN.